US006986049B2

(12) United States Patent
Delany

(10) Patent No.: US 6,986,049 B2
(45) Date of Patent: Jan. 10, 2006

(54) METHOD AND SYSTEM FOR AUTHENTICATING A MESSAGE SENDER USING DOMAIN KEYS

(75) Inventor: Mark Delany, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 22 days.

(21) Appl. No.: 10/671,319

(22) Filed: Sep. 24, 2003

(65) Prior Publication Data

US 2005/0039017 A1  Feb. 17, 2005

Related U.S. Application Data

(60) Provisional application No. 60/497,794, filed on Aug. 26, 2003.

(51) Int. Cl.
*H04L 9/00* (2006.01)

(52) U.S. Cl. ............... 713/176; 713/179; 713/180; 713/201; 709/217; 709/227

(58) Field of Classification Search ........ 713/176–181, 713/201; 709/217, 227
See application file for complete search history.

(56) References Cited

U.S. PATENT DOCUMENTS

| 5,511,122 | A | * | 4/1996 | Atkinson ............... 713/153 |
| 5,555,309 | A | * | 9/1996 | Kruys .................. 380/280 |
| 5,757,920 | A | * | 5/1998 | Misra et al. ............. 713/158 |
| 6,119,234 | A | * | 9/2000 | Aziz et al. .............. 713/201 |
| 6,389,532 | B1 | * | 5/2002 | Gupta et al. ............ 713/163 |
| 6,823,454 | B1 | * | 11/2004 | Hind et al. ............. 713/168 |
| 2003/0065940 | A1 | * | 4/2003 | Brezak et al. ........... 713/201 |
| 2004/0181581 | A1 | * | 9/2004 | Kosco ................... 709/206 |

OTHER PUBLICATIONS

Mercer, Alan, "Configuring Watchguard Proxies: Guideline to Supplementing Virus Protection and Policy Enforcement", Sep. 5, 2003, SANS Institute, entire document, http://www.securitytechnet.com/resource/rsc-center/vendor-wp/watchguard/1255.pdf.*
Delany, Mark, "Domain-based Email Authentication Using Public-Keys Advertised in the DNS (DomainKeys)", The Internet Society , Mar. 25, 2005. entire document,, http://www.ietf.org/internet-drafts/draft-delany-domainkeys-base-02.txt.*
Yahoo, Inc., "Yahoo! Anti-Spam Resource Center—DomainKeys", 2005, Yahoo, Inc., entire document, http://antispam.yahoo.com/domainkeys.*
Microsoft Press, "Computer Dictionary", 3rd edition, 1997, Microsoft Corporation, p. 155.*

* cited by examiner

*Primary Examiner*—Ayaz Sheikh
*Assistant Examiner*—Ronald Baum
(74) *Attorney, Agent, or Firm*—Darby & Darby P.C.; John W. Branch

(57) ABSTRACT

A method and system is directed to providing authentication of a message, such as email, and the like, by combining Public Key encryption and the Internet Domain Name System (the "DNS"). A domain owner may validate that an email originates from an authorized sender within their domain by using a private key component to digitally sign email outbound from its domain. Employing a public key component, along with a selector, an email recipient may check the validity of the signature, and thus determine that the email originated from a sender authorized by the domain owner. In one embodiment, the public key component used to verify an email signature may be "advertised" or otherwise made available via a TXT record in the DNS.

29 Claims, 7 Drawing Sheets

Figure 1:
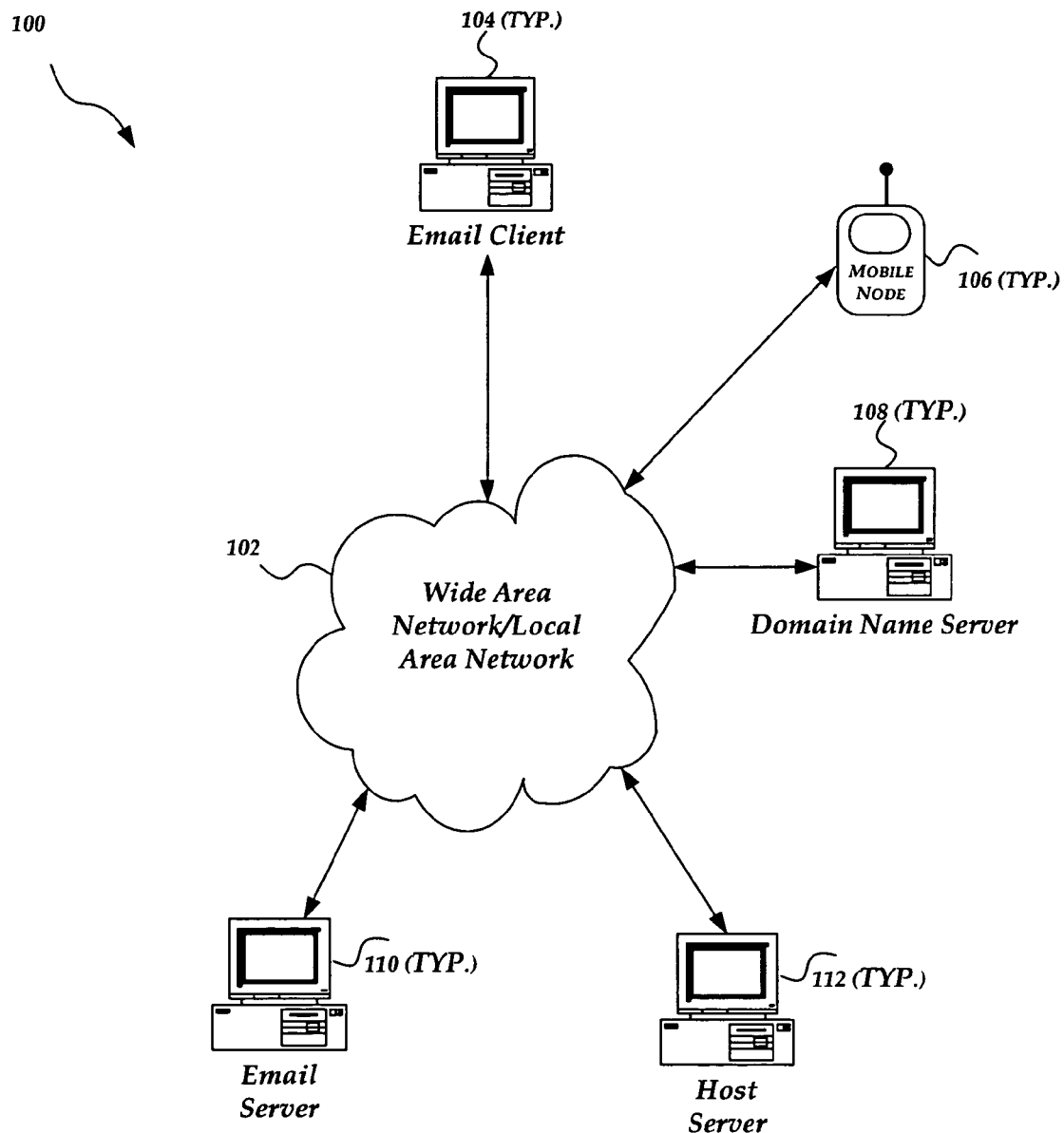

KEY GENERATION AND LOCATION OF
PUBLIC AND PRIVATE COMPONENTS

KEY GENERATION AND LOCATION OF
PRIVATE COMPONENTS AT A
PARTICULAR MAIL SERVER

*AUTHENTICATION OF SENT MESSAGE*

METHOD AND SYSTEM FOR AUTHENTICATING A MESSAGE SENDER USING DOMAIN KEYS

RELATED APPLICATION

This utility patent application is a continuation of previously filed U.S. Provisional Patent Application, U.S. Ser. No. 60/497,794 filed Aug. 26, 2003, the benefit of the earlier filing date is hereby claimed under 35 U.S.C. 119(e).

FIELD OF THE INVENTION

The present invention relates generally to data security and more particularly to determining authentication of a message sender.

BACKGROUND OF THE INVENTION

Today, email addresses are trivial to forge. When an email is received with a sender address of, say, yourBigBoss@yourcompany.example.com there is virtually no way to verify that that email actually came from the person authorized to use that sender address.

Spammers take tremendous advantage of this ability to forge and fake email addresses. Forging and faking email addresses is now so rampant that a good number of email system administrators simply block all email from popularly forged domains, e.g., hotmail.com, msn.com, and yahoo.com, because these email administrators have no way of distinguishing real email from forged email.

This sort of haphazard blocking strategy is now widely deployed across the Internet as email administrators desperately try and deal with the rising flood of spam. Unfortunately, these desperation tactics negatively impacts the benefits of email.

However, if a domain owner could irrefutably determine whether an email legitimately originated from the authorized user of a particular email address or not, then recipient email systems can apply filtering and acceptance policies much more rigorously and accurately without much of the negative impact of the current, relatively arbitrary, methods. Thus, it is with respect to these considerations and others that the present invention has been made.

DETAILED DESCRIPTION OF THE PREFERRED EMBODIMENT

In the following detailed description, reference is made to the accompanied drawings in which are shown specific exemplary embodiments of the invention. These embodiments are described in sufficient detail to enable those skilled in the art to practice the invention, and it is understood that other embodiments may be utilized, and other changes may be made, without departing from the spirit or scope of the invention. The following detailed description is, therefore, not to be taken in a limiting sense, and the scope of the invention is defined only by the appended claims.

Throughout the specification, and in the claims, the meaning of "a," "an," and "the" include plural references. The meaning of "in" includes "in" and "on." Additionally, a reference to the singular includes a reference to the plural unless otherwise stated or inconsistent with the disclosure.

The term "domain owner" includes a representative or delegated system, and the like, that is authorized to administer an internet domain name, known also as "the domain" in the Internet Domain Name System (the "DNS").

The terms "email administrator," "message administrator," and "administrator," include a representative or delegated system, and the like, that receives a message, such as an email.

The term "sender address" includes a message address, such as an email address, employed in the message to identify the sender of that message. This is typically, but not necessarily, the contents of the first "From:" header line in the message. Sender address also applies generically to a claimed message address of the sender, however identified.

Briefly stated, the present invention includes a method and system for verifying that a message, e.g., an email, instant message, and the like, actually originated from a particular domain identified in the sender's "From" address. One embodiment of the invention employs Public/Private key encryption to securely authenticate the origination of the message from a particular domain that corresponds to the sender address. Another embodiment of the invention could employ root keys such as provided by a Certificate Authority, and the like, to authenticate the origination of a message from a particular domain. The invention generally employs any of several different types of key encryption methods that enable a domain owner to provide proof of origination to recipient messaging systems which in turn enables message administrators, and the like, to distinguish forged or "spoofed" sender addresses from legitimate sender addresses.

When a message claims to have been sent by a certain sender address, the invention enables a receiving messaging system to determine whether that email and its contents, did in fact originate from a valid domain that has authorized the use of that sender's address for messaging. While a DNS can be the primary mechanism for publishing and retrieving public keys, the invention can support other key services in addition to the DNS.

The authentication provided by the invention can be employed in a number of scenarios in which other email authentication systems can fail, including, but not limited to, forwarded email, distributed sending systems, roving users, mailing lists, out-sourcing of email services, and the like. In addition to this, the invention can be superior to hierarchical Public Key systems as it places key management, including key revocation, in the direct control of the owner of a domain.

A DomainKey application for implementing the invention can be installed at a client, mail server, or both, depending on the configuration of a particular messaging system. Also, since the invention validates a domain as the origination of a message (not the actual identity of the sender) to the receiver, a messaging system that employs the invention can still provide relatively anonymous messaging services to its customers.

To enable the operation of the invention, relevant information is typically inserted into the header of a message. In this way, messaging issues associated with the forwarding of a message and/or an attachment are reduced.

FIG. 1 illustrates an overview 100 of an exemplary environment in which the invention operates and in which multiple email clients 104 can be in communication with at least one email server 110 and at least one Domain Name server 108 over network 102. Although FIG. 1 refers to email client 104 as an exemplary client device, other types of client devices may be employed with the invention. For example, multiprocessor systems, microprocessor-based or programmable consumer electronics, network PCs, PDAs, wearable computers, and the like. These client devices may also include devices that typically connect to network 100 using a wireless communications medium, e.g., mobile nodes 106, smart phones, pagers, walkie talkies, radio frequency (RF) devices, infrared (IR) devices, integrated devices combining one or more of the preceding devices, and the like.

Generalized Operation of DomainKey Application

Public Key cryptography is a general mechanism which includes a series of mathematical operations applied in conjunction with at least two components: a private key component and a public key component. The private key component is typically kept secret by the owner of those keys and can be used to create a digital signature of any data. The public key component may be made available to the public who can use it to verify that the digital signature was created using the corresponding private key component.

While there are numerous Public Key algorithms available (RSA for example), virtually any Public Key algorithms may be implemented to do at least the following: (a) Generate a Public Key component and the corresponding Private Key component, called "key generation," to produce a "key pair"; (b) Given the Private Key component and some data, generate a digital signature, known as "signing"; and (c) Given a digital signature, the same data and a Public Key component, may be employed to determine if that signature was generated with the same data and corresponding Private Key component. These steps are often employed to "verify" the authenticity of a digital signature.

The inventive DomainKey application may use Public Key cryptography as follows. A domain owner can prove that an email originated from an authorized user within their domain by using the private key component to digitally sign each outbound email. Using the public key component, the recipient system can check the validity of the digital signature accompanying the incoming email and thus prove (authenticate and verify) that the email actually originated from a sender address authorized by the domain owner.

Typically, a Public Key infrastructure includes the HTTPS protocol which operates in conjunction with the Secure Sockets layer (SSL) interface. Although HTTPS in particular and SSL in general exist as a hierarchy that starts with root Certificate Authorities, there is no need for the public key components to be implemented or distributed in substantially this way for the present invention. Rather, the public key component used to verify an email signature may be "advertised" or otherwise made available via a text (TXT) record, which are often stored in the DNS for other reasons. In one example, the public key for the domain "example.com" could be retrieved with a Unix 'dig' command, such as "dig selector.__smtp.__domainkey.example.com txt".

Figure 2:
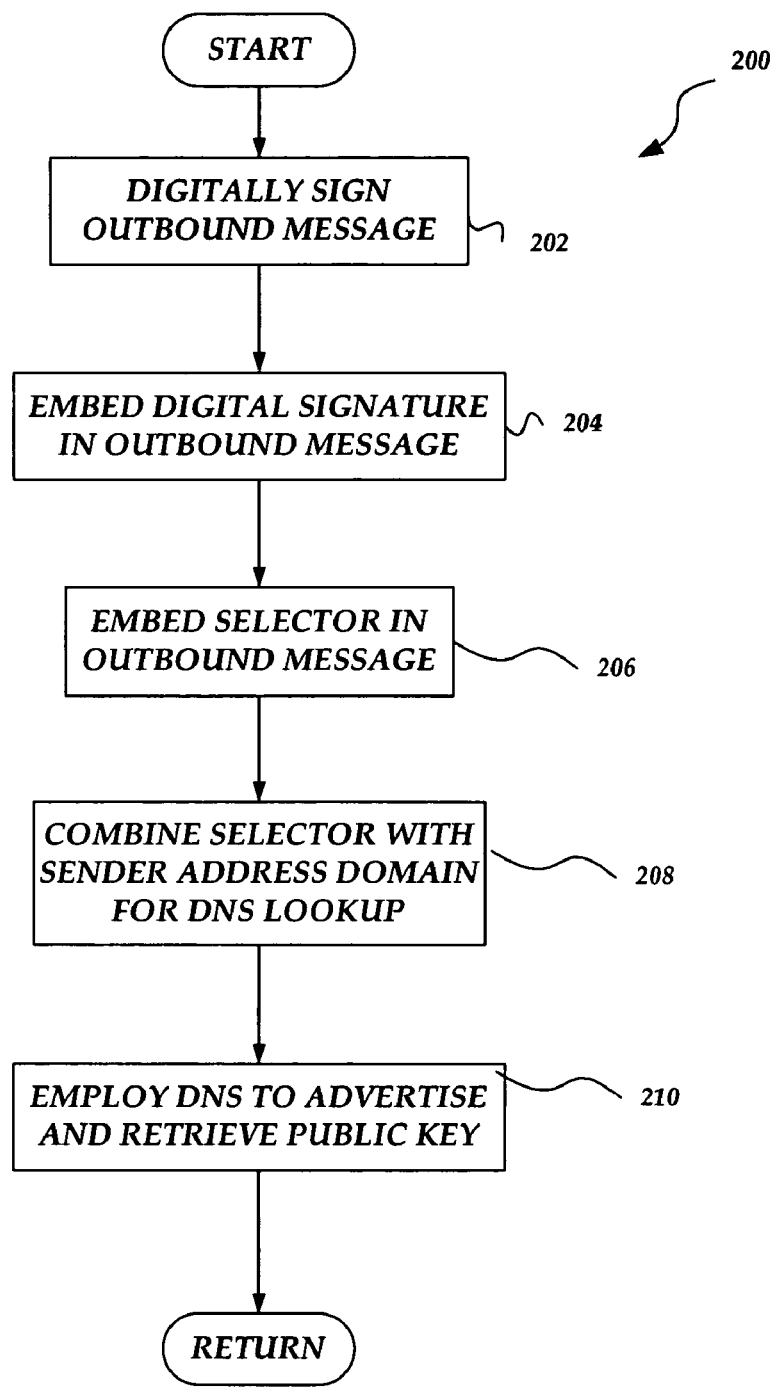

FIG. 2 generally illustrates a process for sending an outbound message, such as an email. Moving from a start block, the process advances to block 202 where an outbound message is digitally signed. At block 204, the digital signature is embedded in the outbound message. At block 206, a DomainKey "selector" is embedded in the outbound message which can be employed for the receipt and authentication of the message. At block 208, the "selector" is combined with the sender address domain to form the DNS lookup query to retrieve the Public Key. Next, at block 210, the DNS infrastructure can be used to advertise and retrieve the Public Key.

Blocks 206, 208 and 210, above introduce the notion of a "selector" which provides substantial flexibility, particularly for large and diverse installations, for rapid revocation and replacement of public keys and for the issuance of public keys to an authorized subset of users within that domain.

There are many advantages to the inventive DomainKey application over other message authentication systems. Some of these advantages may include:

(a) the DomainKey application can handle the forwarding case whereas a proposal like the "Designated Sender" discussed above and RMX typically do not;

(b) Advertising of Public Keys in the DNS reduces the barriers to entry as opposed to a Certificate Authority approach used by SSL. Previously, each domain holder was obliged to pay an annual fee for each certificate handled by a Certificate Authority such as Verisign, and the like;

(c) the DomainKey application can be transparent and compatible with many existing message infrastructures;

(d) the DomainKey application can be implemented independently of clients, thus time to deployment is shorter; and (e) the introduction of a "selector" as a public key component differentiator creates much greater flexibility.

Figure 3:
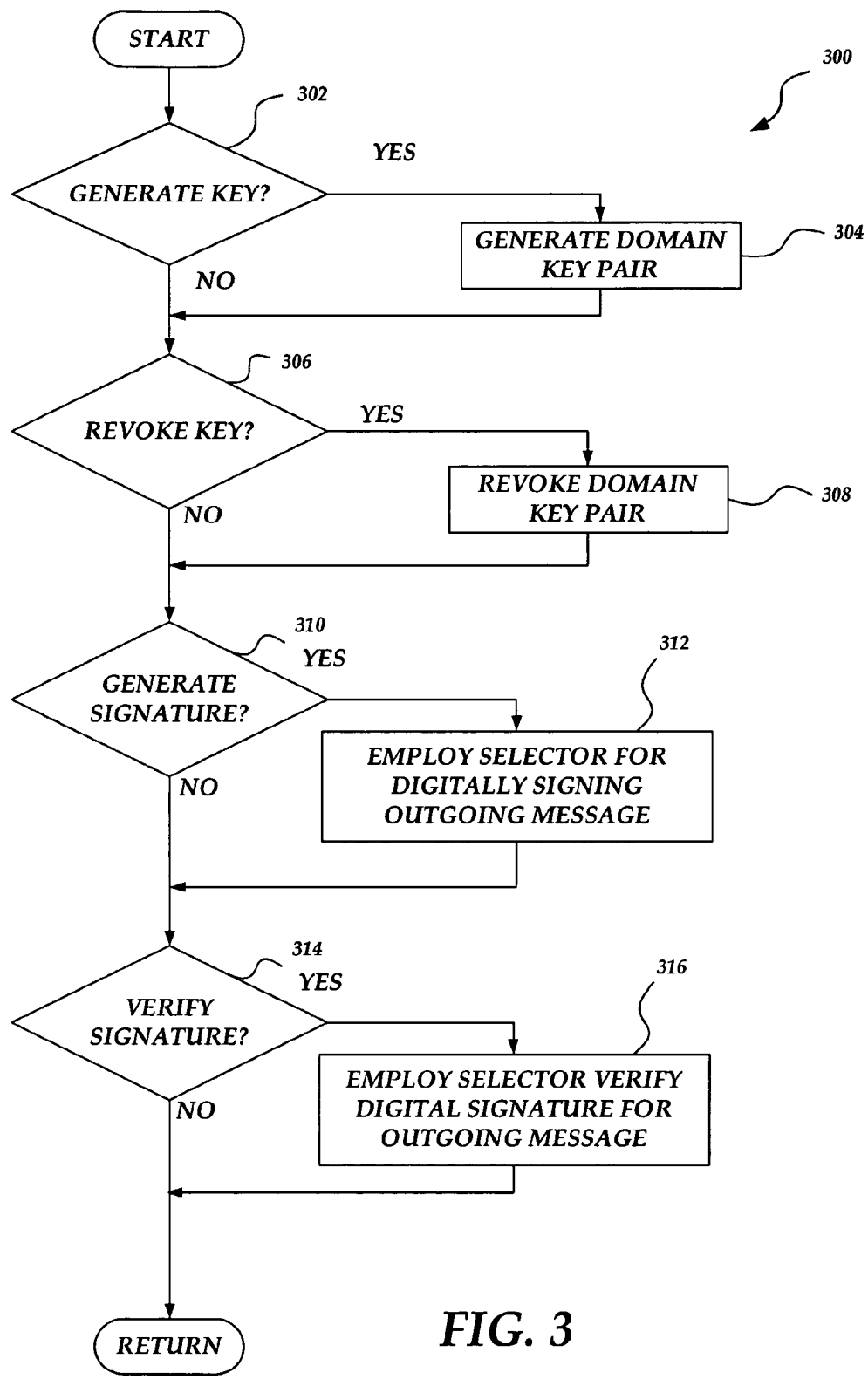

FIG. 3 generally illustrates a flow chart of an overview of several processes that can be performed by the inventive DomainKey application. Moving from a start block, the process advances to decision block 302 where a determination is made as to whether or not a domain key pair is to be generated. If true, the process flows to block 304 where the domain key pair is generated. The generation of the domain key pair is discussed in greater detail below. From block 304 or if there was a negative determination at block 302, the process steps to decision block 306 where another determination is made as to whether or not a domain key pair is to be revoked.

If the domain key pair is to be revoked, the process moves to block 308 where this operation is performed. The revocation of a domain key pair is discussed in greater detail below. From block 308 or if there was a negative determination at block 306, the process moves to decision block 310. At decision block 310, a determination is made as to whether or not an outgoing message will be signed. If true, the process moves to block 312 where a selector and corresponding private key component is employed in the operation of digitally signing the outgoing message. Greater detail regarding the operational steps for digital signing an outgoing message is presented below in the specification.

From block 312 or if there was a negative determination at block 310, the process moves to decision block 314. At decision block 314, a determination is made as to whether or not a digitally signed outgoing message is to be verified. If true, the process moves to block 316 where a selector is employed to identify the particular public key used to verify the digital signature of the outgoing message. Greater detail regarding verification is presented below. Next, from block 316 or if there was a negative determination at block 314, the process moves to a return block where the process returns to performing other actions.

The following discussion illustrates in greater detail the inventive processes discussed in FIG. 3 for key generation, key revocation, and signature generation, and signature verification.

Key Generation

The DomainKey application is not limited to one particular Public/Private Key mechanism, rather it can employ the basic operations and components generally made available by almost all Public/Private Key algorithms.

In the DomainKey application, each Domain key pair generated for a given domain is associated with a unique "selector". The choice of selector values is a local matter, so long as the value can be advertised in the particular key service such as the DNS, and the like, and can safely be added as a part of a message header.

The private key component, along with the corresponding selector can be made available to outgoing mail servers in whatever form suits that implementation. Typically, a data file of some sort could contain this information, but the invention is not so limited.

The corresponding public key component may be rendered into base64, and the like, and advertised in the DNS as a TXT record, or the like, with a name such as:

$selector._smtp._domainkey.$domain

Where $selector may be replaced with the actual value of the selector.

Where the string "._smtp._domainkey." is an address node to be reserved in the DNS for the DomainKey system, and $domain is an actual domain name.

Key Revocation

In one embodiment, the corresponding DNS TXT record, and the like, may be removed from the DNS. Reliance may be made on an intrinsic expiration of DNS data via a time-to-live mechanism (TTL). However, there is no reason that the key revocation has to be permanent. Instead, it could be made available or not, as needs arise, simply by removing or adding the corresponding DNS TXT record, and the like.

Digital Signature Generation:

One embodiment of digital signature generation generally occurs as follows:

(1) If the signing agent detects an existing signature header, the message is passed through, or a local policy may be applied. That is, any action may be entirely a matter of the local system and not constrained by the present invention. In other words if a message appears to be signed, the invention need not attempt to sign it a subsequent time.

(2) Scan the headers to determine the sender address. First look at the first occurrence of the "From:" line and extract the domain from the message address. If no domain name can be extracted, examine the first occurrence of the "Sender:" line and extract the domain name from the message address. If no domain name can be extracted, use the domain name of the envelope sender. The extracted domain is called the "from domain". If no "from domain" can be found, then the message is not signed.

(3) If the message server does not have the private key for the "from domain", apply local policy.

(4) Normalize the contents of the message prior to digital signature generation:
  (a) Regardless of the local convention for line endings, all relevant header and contents lines may be signed as if the line ending is CRLF (ASCII Carriage Return, Line Feed).
  (b) If the last line of the message does not end in a line terminator, or the like, append one to the end of the message. This enables protection against intervening message servers doing this.
  (c) If the message ends with multiple empty lines, and the like, ignore all but the first of these multiple line terminators when calculating signatures.

(5) Using the "from domain" and a selected selector to identify the particular private key, generate the digital signature based on the set of header lines, the separating line and all content lines, including line termination characters, and the like.

(6) Convert the digital signature to base64, or the like, so that it can be sent through an SMTP network, and the like.

(7) Generate the "DomainKey-Signature:" header line. In one embodiment, the header line includes:
  (a) The string "DomainKey-Signature:"
  (b) The signature type and version may include alphanumeric, '-' and '.'. In one embodiment, the digital signature type and version and is no more than 32 characters long. However the invention is not so limited and other lengths may be employed without departing from the scope of the present invention.
  (c) a colon,
  (d) a selector. In one embodiment, the selector is 32 characters long.
  (e) a colon, and
  (f) The digital signature in base64, or the like, encoding.

Typically this line will be header wrapped as, apparently, some message programs cannot cope with header lines longer than 80 bytes.

(8) Prepend the "DomainKey-Signature:" header line to the message.

Digital Signature Verification

To enhance the effectiveness of revocation, the validity of a digital signature for the inventive DomainKey application may be ephemeral. That is, the signing domain vouches for this digital signature for the duration of delivery, and need not vouch for any time period subsequent to that. Consequently, digital signatures may be checked on final delivery rather than subsequent to final delivery.

One embodiment of a process for verifying a digital signature includes:

(1) Scanning a message for the first occurrence of the "DomainKey-Signature:" header. While doing so, occurrences of "DomainKey-Status:" header status lines may be removed or modified such that they are no longer present as that header name.

(2) Extract the signature type, version and signature value from the "DomainKey-Signature:" header.

(3) If the signature type or version are not recognized, apply local policy.

(4) Extract the "from domain" from the message in substantially the same way as defined by the signing process.

(5) If no "from domain" is found, apply the local policy.

(6) Query for the public key component based on the signature type, selector, the "from domain," and the like. In the case of the DNS, the query may be of the form of a TXT record for the name $selector._smtp._domainkey.$fromdomain, or the like.

(7) If the query fails to respond, defer acceptance of this message.

(8) If the query fails because the record does not exist, apply the local policy.

As an interim until widely adopted, the DomainKey application can use a place-holder DNS entry at the _smtp._domainkey.node which indicates whether that particular domain is participating in the DomainKey application or not. The presence of the place-holder indicates participation while the absence of the place-holder indicates non-participation.

(9) Using the public key component returned from the query, check the signature against the entire contents of the email following the "DomainKey-Signature:" header line. Again, the contents are canonically treated in exactly the same way as they are in the signing process.

(10) If the digital signature fails, apply local policy.

(11) In all cases where the message is accepted for delivery, local policy may be conveyed to the message client via a "DomainKey-Status:" header line that precedes the DomainKey-Signature:" header line.

EXAMPLES

The following example for the DomainKey application is intended to introduce at least one embodiment of the present invention and illustrate how its concepts may be integrated into a flow of email.

Email Composed by User
    From: "Joe SixPack"<joe@football.example.com>
    To: "Suzie Q"<suzie@shopping.example.net>
    Subject: Is dinner ready?
    Date: Fri, 11 Jul. 2003 21:00:37-0700 (PDT)
    Message-ID:
        <20030712040037.46341.5F8J@football.example.com>
    Hi.
    We lost the game. Are you hungry yet?
    Joe.

Nothing about the email authorship process is changed by the DomainKey application. In some implementations it is expected that the sender may have no need to know that the DomainKey application exists.

Email Signed by Sending Email Server
Using the private key component, this email is signed by the example.com outbound mail server and now looks something like this:
    DomainKey-Signature: sigs-0.50:D8CD98F00B204E98:
        AMLfamjh4GrUzSN5BeUC13qwlq/hL6 GOk8M/
        1UNjSRruBNmRugCQoX7/
        mHSbSF5Dimr5ey1K6MZg0XclZucPW/s9UWm/
        mxqWP 5uD42B6G+MbSicsj/2obMIBIQjNzRX7A19
        r0Ui4NFzjDVtO74vgMIMJepyJ R3N0qPm8zGe+
        gXhcNBbCuxE0T2keDkJQP8ZJt1WL+
        t6IhbTX3vWxtK0CtjaXYCx VJ5IoyroMxfpdw
        U6doIfEabodyC1Tu+9xvOfHVK+JK7rz+wwbvRrxi
        LfrYigYTm4TQ 9v1HkW9nt9/7aLw/rN2Fs/
        kGwKMZwxQ9ypgi9qOpNX/
        TAceElOp8+jAXW70R7pZYzdrNTq0/
        IfZu76nq6YnQux7
    Received: from dsl-10.2.3.4.network.example.com
        [10.2.3.4] by submitserver.example.com with SUB-
        MISSION;
    Fri, 11 Jul. 2003 21:01:54-0700 (PDT)
    From: "Joe SixPack"<joe@football.example.com>
    To: "Suzie Q"<suzie@shopping.example.net>
    Subject: Is dinner ready?
    Date: Fri, 11 Jul. 2003 21:00:37-0700 (PDT)
    Message-ID:
        <20030712040037.46341.5F8J@football.example.
        com>
    Hi.
    . . . etc Here we can see that additional header lines have been added to this email. Of particular interest are the contents of the "DomainKey-Signature:" line, which has three colon separated components:

(1) A digital signature type and version—in this case "sigs-0.50". This defines which algorithm is used to check the signature. It also defines the location and form of the query used to retrieve the corresponding Public Key.

(2) The DomainKey Selector—in this case "D8CD98F00B204E98". This selector is used to form a query for the Public Key. It is understood that a selector can be provided by which multiple Public Keys for a single domain name might co-exist.

(3) The digital signature data encoded as a base64 string—in this case the string starting with "AMLfamjh4GrUzSN". This is the output of the digital signature generation process.

White spaces are typically ignored in this header and may be removed when using the components to verify the email. The signature typically applies to every line following the first "DomainKey-Signature:" header line.

Note that as some email systems re-write headers, it may be appropriate to sign a canonical form of vulnerable headers and sign a specific subset of header.

Authentication of Email by Receiving Email Server
For an email, the digital signature is normally authenticated by the final delivery agent. However, intervening mail servers may also perform this authentication if they choose to do so.

One embodiment of a process for authentication includes the following steps:

(1) The selector and digital signature are extracted from the "DomainKey-Signature:" header line.

(2) The domain is extracted from the sender address. This is the contents of the first "From:" header. If no domain can be extracted, then extract from the first "Sender:" header line. If no domain can be extracted then the domain is extracted from the envelope sender.

(3) The DNS is queried for a TXT record associated with the following name:
    D8CD98F00B204E98._smtp._domainkey.example.com
Note that the selector "D8CD98F00B204E98" forms part of the DNS query as part of the DomainKey process.

(4) The returned TXT record includes the base64, or the like, encoded Public Key for that selector/domain combination. This Public Key may be used to authenticate the digital signature according to the Signature type and version algorithm.

(5) If no TXT record exists, the digital signature is a forgery or this Domain key pair has been revoked by the domain owner.

(6) Policy is typically applied to the email depending on:
    (a) the presence of a DomainKey-Signature: header
    (b) the results of the Public Key lookup
    (c) the results of the digital signature verification
    (d) Assuming the digital signature is valid, this knowledge is communicated to the UA via the "DomainKey-Status: good" header line which is prepended to the email.

Selectors
Selectors enable flexibility in the inventive DomainKey application. A domain owner is free to use a single selector for all out-bound mail. They may also use many uniquely selected Domain key pairs and assign each Domain key pair and selector to different users, different groups of users or different mail servers. For example:

(1) A large outbound mail farm of, say, 200 servers might each have their own selector and Domain key pair. Thus, their DNS could advertise all 200 public key components via their unique selectors.

(2) A corporate mail administrator might generate a unique selector and Domain key pair for each regional office mail server. Their DNS might advertise one public key component for each regional office.

(3) Roving users who are obliged to use untrusted or unknown mail servers (such as their hotel mail server when traveling) can be issued personal Domain keys that can be used to digitally sign email prior to submission to the untrusted mail server. Again, the selector ensures that any number or combination of Domain keys can be issued and removed at any time.

Whilst management of domain key pairs may be entirely a local matter for each domain owner, there are other methods to assist a domain owner to gain the maximum benefit of the DomainKey application. However, such methods are not intended to limit or constrain the present invention.

Key Management at Local Servers (1) Generate new server-wide Domain key pairs on a regular basis.

(2) Allow old keys to exist in the DNS for an overlapping period of at least seven days after the latest key is in use.

(3) Use a modest TTL so that key revocation can be rapidly achieved by the simple expedient of removing that RR from the relevant zone.

Key Management with Third Parties

Some domain owners may need to out-source their e-marketing to a specialist company. In this case, uniquely selected Domain keys can be generated by the domain owner and its private key component can be supplied to the e-marketing company which uses that private key component to sign the outbound mail on behalf of the domain owner. On completion of the out-sourcing project, the domain owner simply removes that selector's Domain key from their DNS at which point subsequent email signed with the original private key component will fail the digital signature test.

Compromised Key

Key compromise means that the private key component has, or is, being used without authorization. One remedy may be to revoke that particular key pair by removing the public component from the DNS.

Designated Sender and RMX

Designated Sender and RMX likewise address the concept of identifying valid sources of email for a given domain. Both of these schemes may be simpler to implement as they use the DNS to advertise fixed addresses of valid sending email servers. These fixed addresses are amenable to an RBL-type lookup mechanism that is built into many mail servers. It also requires no cryptographic analysis.

However, both schemes fail to cater for forwarded mail which can be a huge problem, as forwarding is a very popular part of the email system. Consider alumni-type forward services, commercial forwarding services such as pobox.com and professional forwarding services such as ieee.org. All of these would likely fail Designated Sender and RMX tests, whereas the inventive DomainKey application would not.

Certificate Authority (CA) approach

A CA approach means that every key may cost money. Currently that may be of the order of $100 per year per domain. That's a huge cost given that, today, there are some 1,000,000+domains on the planet, and growing. Due to this cost barrier, the CA approach is unlikely to be adopted by most domain owners. Conversely, Domain Keys are virtually free and are just as secure, if not more so, and can be readily adopted by domain owners with virtually zero on-going cost.

A huge problem with the traditional CA approach is that there is no simplistic revocation system in place. If a key is compromised there is no way to tell the rest of the world that there is a replacement key and that the old key can no longer be trusted. With a DNS approach you simple generate a new key and change your DNS entry. Within the TTL of your DNS (typically a day or so) your old key is irrelevant and invalid.

Advertising Public Keys

As alluded to earlier, in one embodiment the inventive DomainKey application uses the DNS to advertise public key components, as it provides an excellent authority for a given domain. For example, only joesixpack.com would be able to create an entry for _domainkey.joesixpack.com.

Additionally, DNS is an existing infrastructure that is known to work well and will easily handle the load. In fact, the total DNS load may reduce as reverse queries may well not be needed with the DomainKey application and a reverse query is more costly and less cacheable than a DomainKey message.

DNS is also efficient. A 2048 bit public key comfortably fits inside the 512 maximum size of a UDP packet for DNS.

Finally, the inventive DomainKey application is not constrained to using the DNS. A separate key server infrastructure is entirely possible as indicated by the Key type and version in the DomainKey-Signature: header.

Using the DNS could present a security risk because the DNS itself is currently vulnerable. However, the sorts of attacks possible on the DNS are typically costly compared to the rewards of forging a DomainKey digital signature. Also, since the DomainKey application is used to prove that the sender of the email has the authority to use a particular From: email address, verification of that email's content is beyond its purpose, and more cautious users might want to protect content with other third party encryption technology, such as Pretty Good Privacy (PGP), and the like.

Figure 4:
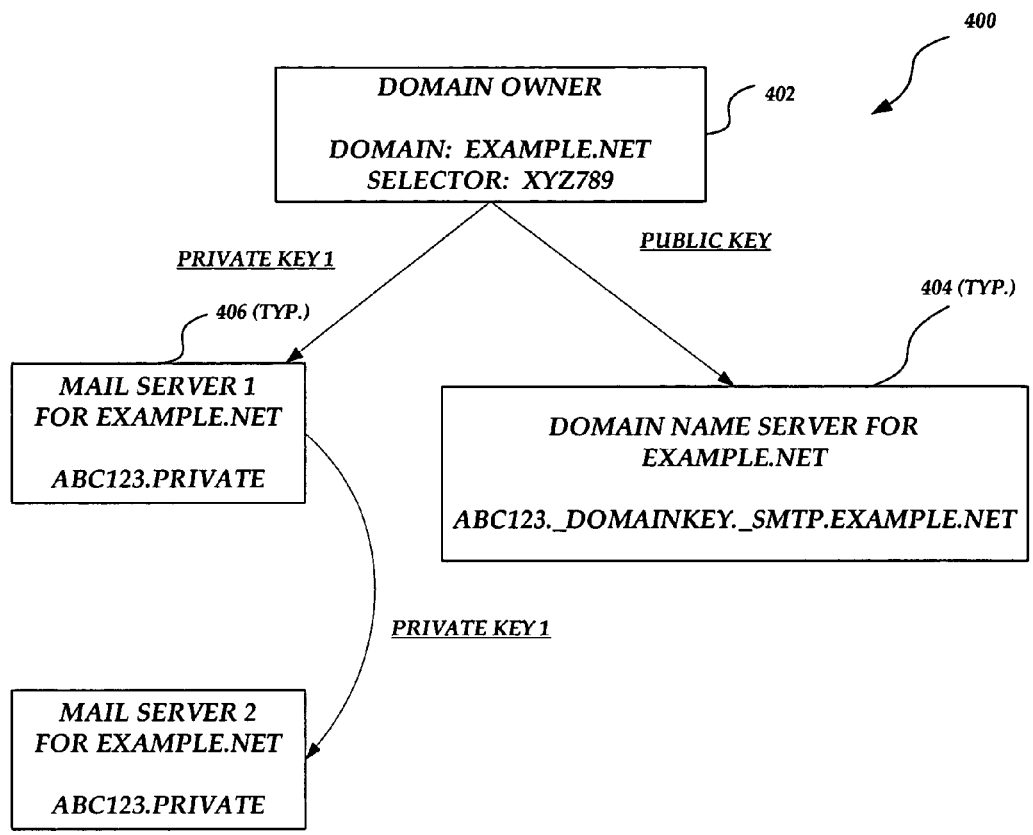

FIG. 4 illustrates an overview 400 of the process flow for generating a domain key pair and distributing the private key components to every mail server associated with the domain. As shown in block 402, the owner of a domain e.g., example.net, generates the key pair for the domain and a selector (ABC 123). The domain owner distributes the private key with the selector to each mail server 406 associated with the domain. Also, the domain owner distributes the public key component of the domain key pair to each DNS 404 that is employable to resolve a request for the domain. The selector is employed to store and identify the public key in a TXT record for the DNS.

Figure 5:
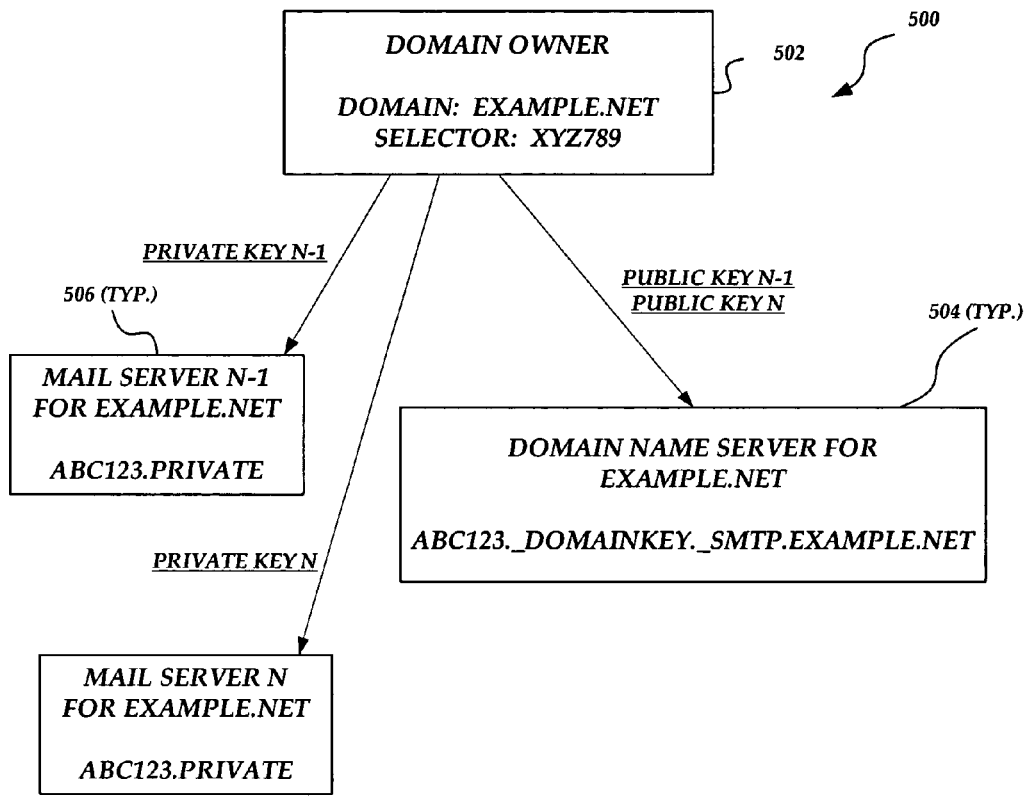

FIG. 5 illustrates an overview 500 of the process flow for enabling a domain owner to generate multiple domain key pairs for an individual sender or a group of senders and distribute the private key components to a particular mail server associated with the domain. As shown in block 502, the owner of the domain generates multiple domain key pairs. All of the public key components are distributed to each DNS 504 that is employable to resolve a request for the domain. However, the private key components for the separate domain key pairs are distributed to a particular mail server that is associated with the domain. In this way, domain key pairs can be generated for handling by a particular mail server that is geographically close to the sender of a message.

The invention enables management of domain key pairs for an individual sender or a group. In particular, multiple domain key pairs can be employed where it is anticipated that a messaging service will be revoked for at least an individual sender or group of senders in the foreseeable future.

Figure 6A:
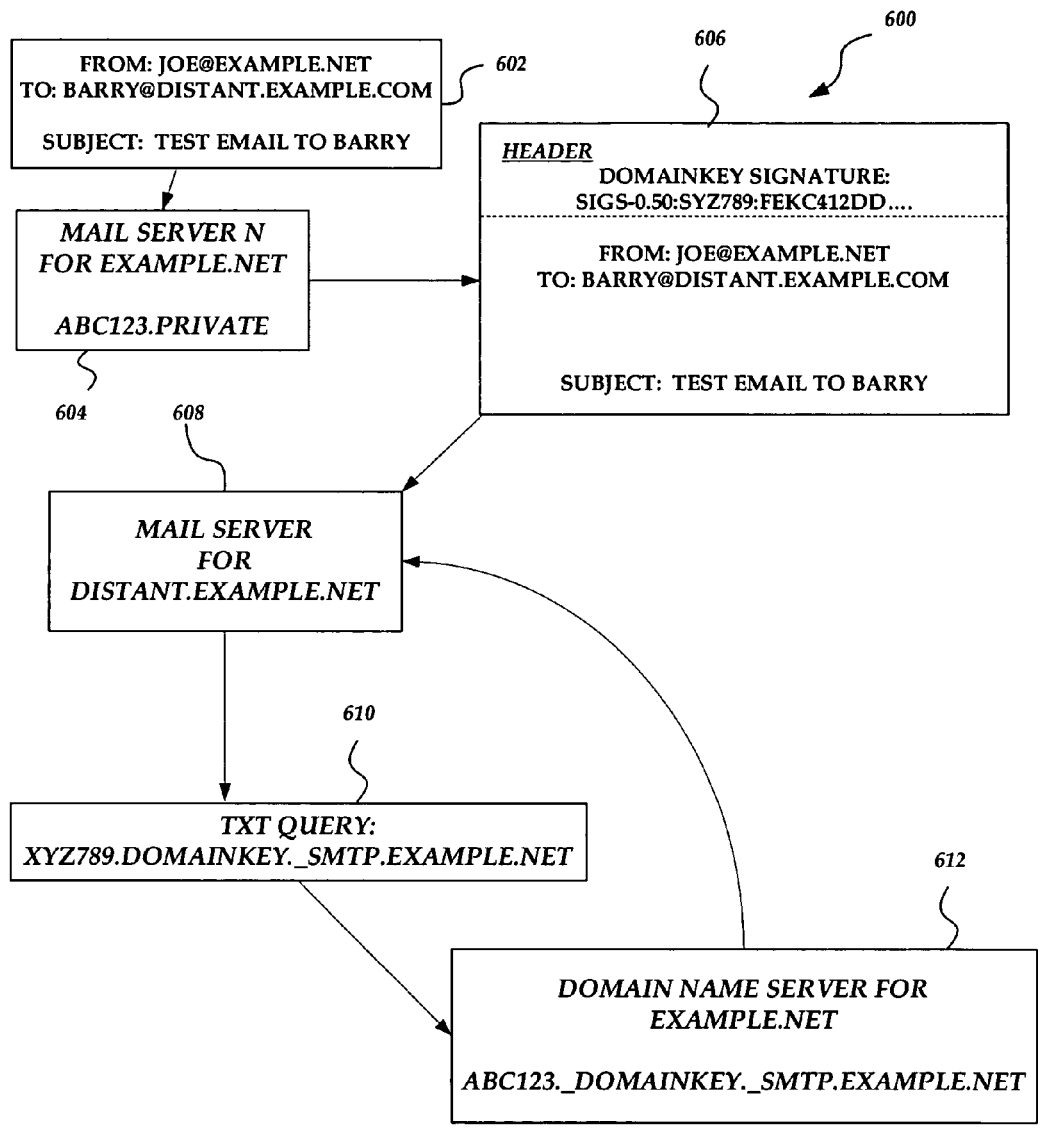
Figure 6B:
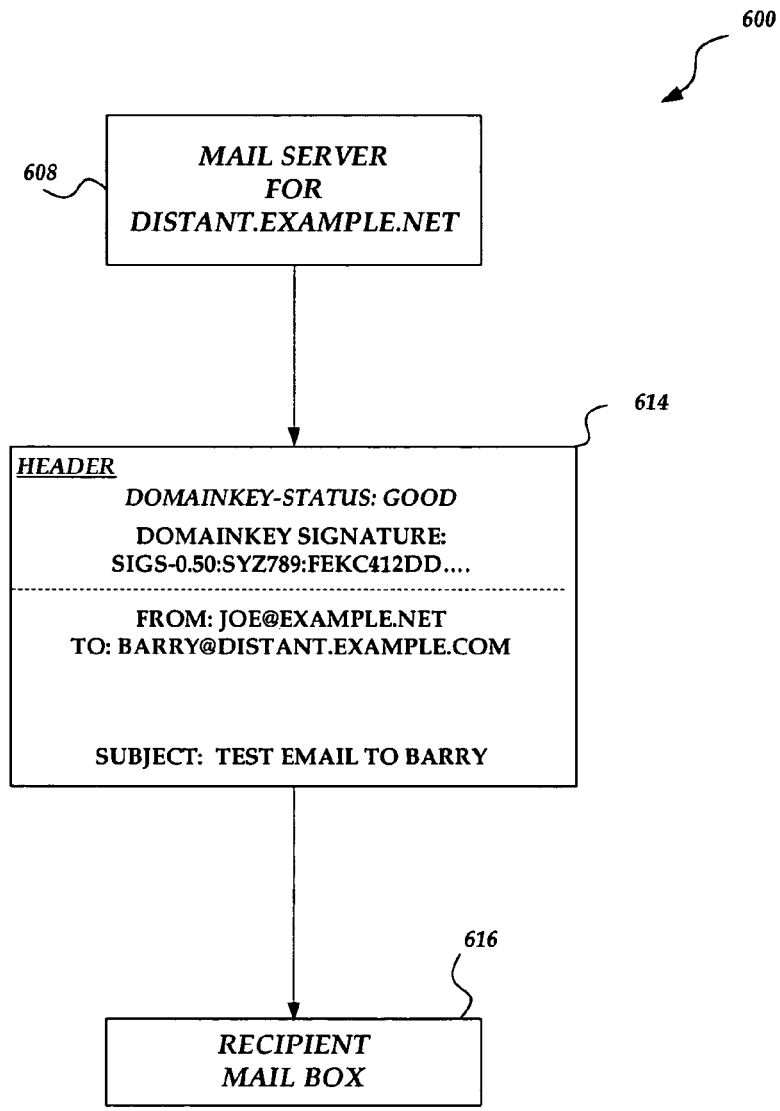

FIGS. 6A and 6B illustrate an overview 600 of the process flow for authenticating the domain of origination for a message and providing an authenticated message to the mail box of the recipient. A message 602 is generated by the sender and provided to mail server 604 for the domain associated with the sender's address. Mail server 604 confirms that the sender is authorized to send a message from the domain. If the sender is authorized, mail server 604 digitally signs the message and inserts the signature in the header of the message. The digitally signed message 606 is forwarded to another mail server 608 which is associated with the domain of the recipient. Next, the other mail server 608 sends a TXT query to DNS 612 which is associated with the domain. The TXT query includes a selector for identifying the public components of the domain key pair. If found, DNS 612 provides the public components to the other mail server 608 to be used to verify the domain as the origination of the message.

Finally, as shown in FIG. 6B, once the domain is verified by the other mail server 608, this server inserts a "good" status in the header of the digitally signed message 614, which is then forwarded to the recipient's mail box 616.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A method for message authentication, comprising:
   generating a key pair associated with a domain, wherein a public component of the key pair is accessible to a domain name server (DNS) that is associated with the domain;
   employing a message server associated with the domain to employ a private component of the key pair to digitally sign the message;
   employing a message server associated with a domain of a recipient to verify the domain of origination for the message with the public component of the key pair;
   if a message originates from a sender's address associated with the domain, employing the private component of the key pair to digitally sign the message and forwarding the digitally signed message towards the recipient of the message; and
   if the public component stored with the DNS verifies that the digitally signed message originated from the domain associated with the sender's address, providing the verified digitally signed message to the recipient.

2. The method of claim 1, further comprising a text record that is accessible to the DNS and which includes at least the public component of the key pair.

3. The method of claim 1, further comprising generating a selector that is associated with the key pair, wherein the selector is employable to identify the key pair's public component for accessing by the DNS.

4. The method of claim 3, further comprising forming a lookup query for the DNS by combining the selector with the sender's address.

5. The method of claim 1, wherein the message server includes a mail server associated with the domain to forward the digitally signed message towards the recipient of the message.

6. The method of claim 1, wherein the message server includes a mail server associated with the domain to employ the private component of the key pair to digitally sign the message.

7. The method of claim 1, wherein the message server includes a mail server that is associated with the domain of the recipient to verify the domain of origination for the message with the public component of the key pair.

8. The method of claim 1, wherein the message server includes a mail server that is associated with the domain of the recipient to provide the verified digitally signed message to the recipient.

9. The method of claim 1, further comprising accessing the public component of the key pair by employing a text record in a look up table for the DNS.

10. The method of claim 1, further comprising generating a plurality of key pairs associated with the domain, wherein at least two key pairs are associated with at least two different senders and wherein each public component of each key pair is accessible by the DNS associated with the domain.

11. The method of claim 10, further comprising separately associating private components of the at least two key pairs with at least two mail servers, wherein the at least two mail servers are associated with the domain.

12. The method of claim 10, wherein each private component of each key pair employs a mail server associated with the domain to forward the digitally signed message towards the recipient of the message.

13. The method of claim 1, further comprising employing one of a plurality of mail servers associated with the domain to digitally sign the message with the private component of the key pair and forward the digitally signed message towards the recipient.

14. A system for message authentication, comprising:
   a client that is enabled to generate at least one message for a recipient, wherein the client is associated with a domain;
   a mail server associated with the domain of the client, wherein the mail server performs actions, including:
      enabling the generation of a key pair associated with the domain, wherein a public component of the key pair is accessible to a DNS that is associated with the domain; and
      if a message from the client originates from the domain, enabling a private component of the key pair to digitally sign the message and forward the digitally signed message towards the recipient of the message; and
   a mail server associated with a domain of the recipient, wherein the mail server performs actions including enabling the public component stored with the DNS to verify that the digitally signed message originated from the domain associated with the client, and enabling each verified digitally signed message to be provided to the recipient.

15. The system of claim 14, wherein the message is at least one of an email, instant message (IM), short message service (SMS).

16. The system of claim 14, further comprises a text record that is accessible to the DNS and which includes at least the public component of the key pair.

17. The system of claim 14, further comprises a selector that is associated with the key pair, wherein the selector is employable to identify the key pair's public component for accessing by the DNS.

18. The system of claim 14, further comprising a plurality of key pairs that are associated with at least two different clients, wherein each public component of each key pair is accessible by the DNS associated with the domain.

19. A processor readable medium of tangibly embodied software that enables actions for message authentication, comprising:

generating a key pair associated with a domain, wherein a public component of the key pair is accessible to a domain name server (DNS) that is associated with the domain;

enabling a message server associated with the domain to employ a private component of the key pair to digitally sign the message;

enabling a message server associated with a domain of a recipient to verify the domain of origination for the message with the public component of the key pair;

if a message originates from a sender's address associated with the domain, employing the private component of the key pair to digitally sign the message and forwarding the digitally signed message towards the recipient of the message; and if the public component stored with the DNS verifies that the digitally signed message originated from the domain associated with the sender's address, providing the verified digitally signed message to the recipient.

20. The processor readable medium of claim 19, further comprising generating a selector that is associated with the key pair, wherein the selector is employable to identify the key pair's public component for accessing by the DNS.

21. The processor readable medium of claim 19, further comprising generating a plurality of key pairs associated with the domain, wherein at least two key pairs are associated with at least two different senders and wherein each public component of each key pair is accessible by the DNS associated with the domain.

22. The processor readable medium of claim 21, further comprising separately associating private components of the at least two key pairs with at least two mail servers, wherein the at least two mail servers are associated with the domain.

23. The processor readable medium of claim 21, wherein each private component of each key pair employs a mail server associated with the domain to forward the digitally signed message towards the recipient of the message.

24. A client that enables message authentication, comprising:

a first component for originating a message for communication by a message server associated with a domain, wherein a key pair is associated with the domain, wherein a public component of the key pair is accessible to a domain name server (DNS) that is associated with the domain;

a second component for enabling the message server associated with the domain to employ a private component of the key pair to digitally sign the originated message;

a third component for enabling a message server associated with a domain of a recipient to verify the domain of origination for the message with the public component of the key pair;

if a message originates from a sender's address associated with the domain, a fourth component that provides for enabling a private component of the key pair to be employed to digitally sign the message and forwarding the digitally signed message towards a recipient of the message; and if the public component stored with the DNS verifies that the digitally signed message originated from the domain associated with the sender's address, a fifth component for providing the verified digitally signed message to the recipient.

25. The client of claim 24, further comprising enabling the generation of a plurality of key pairs associated with the domain, wherein at least two key pairs are associated with at least two different senders and wherein each public component of each key pair is accessible by the DNS associated with the domain.

26. The client of claim 25, further comprising enabling the separate association of private components of the at least two key pairs with at least two mail servers, wherein the at least two mail servers are associated with the domain.

27. The client of claim 25, further comprising enabling each private component of each key pair to employ a mail server associated with the domain to forward the digitally signed message towards the recipient of the message.

28. A message server that enables message authentication, comprising:

a first component for enabling the generation of a key pair associated with a domain, wherein a public component of the key pair is accessible to a domain name server (DNS) that is associated with the domain;

wherein the message server is associated with the domain and employs a private component of the key pair to digitally sign a message that is originated with the message server;

a second component for enabling a message server associated with a domain of a recipient to verify the domain of origination for the message with the public component of the key pair;

if a message originates from a sender's address associated with the domain, a third component for enabling the private component of the key pair to be employed to digitally sign the message and forwarding the digitally signed message towards the recipient of the message; and if the public component stored with the DNS verifies that the digitally signed message originated from the domain associated with the sender's address, a fifth component for providing the verified digitally signed message to the recipient.

29. A method for enabling message authentication, comprising:

means for enabling the generation of a key pair associated with a domain, wherein a public component of the key pair is accessible to a domain name server (DNS) that is associated with the domain;

means for employing a message server associated with the domain to employ a private component of the key pair to digitally sign the message;

means for employing a message server associated with a domain of a recipient to verify the domain of origination for the message with the public component of the key pair;

if a message originates from,a sender's address associated with the domain, means for enabling a private component of the key pair to be employed to digitally sign the message and forwarding the digitally signed message towards a recipient of the message; and if the public component stored with the DNS verifies that the digitally signed message originated from the domain associated with the sender's address, means for providing the verified digitally signed message to the recipient.

* * * * *

UNITED STATES PATENT AND TRADEMARK OFFICE
CERTIFICATE OF CORRECTION

PATENT NO. : 6,986,049 B2  Page 1 of 1
APPLICATION NO. : 10/671319
DATED : January 10, 2006
INVENTOR(S) : Mark Delany It is certified that error appears in the above-identified patent and that said Letters Patent is hereby corrected as shown below:

On the title page item (56), Col. 2 (Other Publications), Line 8, After "2005" delete ".".

On the title page item (56), Col. 2 (Other Publications), Line 8, After "document," delete ",".

Column 1, Line 9, After "60/497,794" insert -- , --.

Column 1, Line 47, Delete "EMBODIMENT" and insert -- EMBODIMENTS --.

Column 7, Line 2, Delete "DomainKey-Signature:"" and insert
-- "DomainKey-Signature:" --.

Column 11, Line 48, In Claim 2, after "comprising" insert -- employing --.

Column 11, Line 49, In Claim 2, delete "that is accessible to the DNS and which includes at least" and insert -- to make available --.

Column 11, Line 50, In Claim 2, delete "pair." and insert -- pair, wherein the text record is accessible to the DNS --.

Column 14, Line 53, In Claim 29, after "from" delete ",".

Signed and Sealed this

Fifth Day of February, 2008

JON W. DUDAS
*Director of the United States Patent and Trademark Office*